(12) United States Patent
Ziada et al.

(10) Patent No.: US 10,818,085 B1
(45) Date of Patent: Oct. 27, 2020

(54) SYSTEMS AND METHODS FOR 3D TOLERANCE ANALYSIS

(71) Applicant: Ford Global Technologies, LLC, Dearborn, MI (US)

(72) Inventors: Youssef Ziada, Milford, MI (US); David Doody, Ontario (CA); Jerry Jau-Yeu Lai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/435,194

(22) Filed: Jun. 7, 2019

(51) Int. Cl.
*G06T 17/20* (2006.01)
*G06F 30/23* (2020.01)
*G06F 119/18* (2020.01)

(52) U.S. Cl.
CPC ............. *G06T 17/20* (2013.01); *G06F 30/23* (2020.01); *G06F 2119/18* (2020.01); *G06T 2219/012* (2013.01)

(58) Field of Classification Search
None
See application file for complete search history.

(56) References Cited

U.S. PATENT DOCUMENTS

| | | |
|---|---|---|
| 6,973,358 B2 | 12/2005 | Yamamoto et al. |
| 7,590,497 B2 | 9/2009 | Tornquist et al. |
| 2002/0143507 A1* | 10/2002 | Lu .......................... G06F 30/13 703/7 |
| 2004/0194051 A1* | 9/2004 | Croft ...................... G06F 30/23 703/2 |
| 2007/0168081 A1 | 7/2007 | Shin et al. |
| 2016/0321384 A1 | 11/2016 | Pal et al. |
| 2017/0193699 A1* | 7/2017 | Mehr ...................... G06F 17/10 |
| 2020/0064821 A1* | 2/2020 | Sato ....................... G06Q 10/06 |

OTHER PUBLICATIONS

Stroia, M. D., et al. ("Case studies for automotive components using CAD and CAE techniques." Journal of Physics: Conference Series. vol. 1426. No. 1. IOP Publishing, 2020) (Year: 2020).*

(Continued)

*Primary Examiner* — Nurun N Flora
(74) *Attorney, Agent, or Firm* — Brandon Hicks; Eversheds Sutherland (US) LLP

(57) ABSTRACT

This disclosure is generally directed to 3D tolerance analysis. In one exemplary method, a combination of a variation analysis procedure and a finite element analysis (FEA) procedure is executed by a computer. The variation analysis procedure involves determining a first simulated force for effecting a mating between a first surface of a first part and a first surface of a second part. A first set of deformation parameters is determined by applying the first simulated force to the first surface of the first part. The FEA procedure involves determining a second simulated force for effecting the mating between the two surfaces based on one or more assembly loads. A second set of deformation parameters is determined by applying the second simulated force to the first surface of the first part. Various deformation parameters of the mated assembly can be obtained by combining the first and second set of deformation parameters.

20 Claims, 6 Drawing Sheets

(56) References Cited

OTHER PUBLICATIONS

Korbi, A., et al. ("CAD/tolerancing integration: a new approach for tolerance analysis of non-rigid parts assemblies." The International Journal of Advanced Manufacturing Technology 98.5-8 (2018): 2003-2013) (Year: 2018).*

Ghionea, Ionut Gabriel. ("Optimization approach to conception of a mechanical part using CAD/FEM techniques." UPB Scientific Bulletin, Series D 71.4 (2009): 43-52) (Year: 2009).*

Beaucare, et al., "Statistical tolerance analysis of a mechanism with gaps based on system reliability methods," 12th CIRP Conference on Computer Aided Tolerancing, 2013, vol. 10, pp. 2-8. doi: 10.1016/j.procir.2013.08.005.

Falgarone, et al. Variation Simulation During Assembly of Non-rigid Components. Realistic Assembly Simulation with ANATOLEFEX Software. 14th CIRP CAT 2016—CIRP Conference on Computer Aided Tolerancing, at Goteborg, 2016, vol. 43, pp. 202-207. doi:10.1016/j.procir.2016.02.336.

* cited by examiner

SYSTEMS AND METHODS FOR 3D TOLERANCE ANALYSIS

FIELD OF THE DISCLOSURE

This disclosure generally relates to tolerance analysis, and more particularly relates to 3D tolerance analysis of mating parts.

BACKGROUND

Manufacturing certain types of mechanical parts can be expensive and complicated, especially when the mechanical parts have complex shapes and are to be mated to each other with a high degree of precision. If carried out improperly, such as by employing a trial-and-error assembly procedure, the mated assembly may suffer from various imperfections such as gaps, warping, and misalignment. Consequently, engineers often use computer-based procedures such as 3D modeling, structural analysis, and simulations, to mimic various assembly operations and ensure that the mated assembly has an acceptable level of quality.

Deformation parameters play a significant role among various parameters that engineers take into consideration when using computer-based analysis and simulation procedures. A first mechanical part that is to be mated with a second part may have a first set of tolerances that is acceptable as far as the first part is concerned. For example, the first part may have an acceptable amount of positive deviation from a nominal value for an angular section of the first part. The second part may have a second set of tolerances that is also acceptable as far as the second part is concerned. However, the first set of tolerances specified for the first part may be different than the second set of tolerance specified for the second part. Consequently, when the two parts are assembled together an unacceptable gap may be present between the two parts.

Engineers attempt to model and simulate the mating of these two parts with each other by using various tolerance values so as to determine pre-emptive actions that may be taken to address the issue. Typically, the engineers may obtain data from documents issued by various standards committees in order to abide by certain standards of quality. In some cases, such data may be unavailable or may be inadequate. In such cases, the engineers may rely on their expertise to estimate and evaluate the modeling and simulation procedures. However, traditional procedures associated with estimating values for simulation procedures can be time-consuming and expensive in view of such procedures being trial-and-error in nature. Furthermore, if multiple procedures have to be applied, each of the multiple procedures may be executed sequentially, which can be not only time consuming but may also provide conflicting or ambiguous results It is therefore desirable to provide systems and methods that allow for modeling and simulation procedures that provide reliable results and are less time-consuming.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
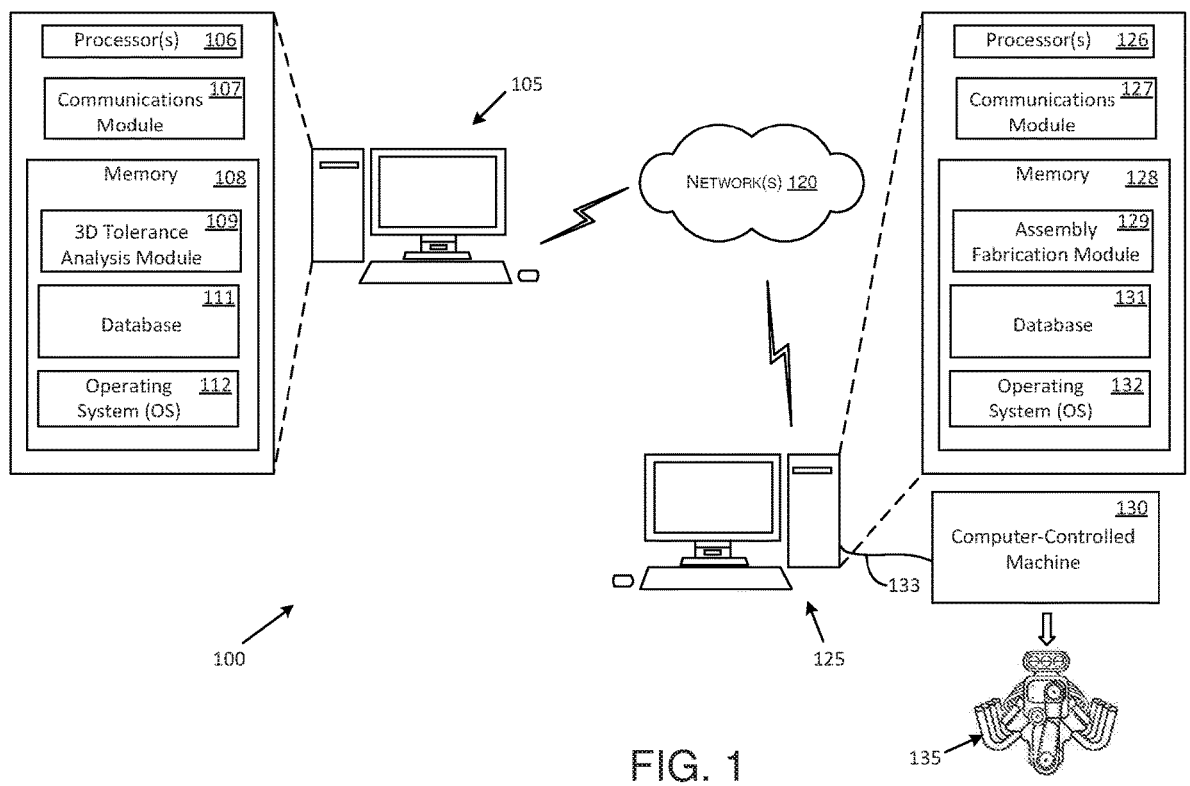
FIG. 1 illustrates an exemplary system that may be used for 3D tolerance analysis of an assembly in accordance with an embodiment of the disclosure.

In terms of a general overview, various exemplary embodiments described in this disclosure are directed to systems and methods for 3D tolerance analysis. In one exemplary computer-implemented method, a combination of a variation analysis procedure and a finite element analysis procedure may be executed for determining geometric tolerances, dimensional tolerances, and/or deformation of a first part when mated with a second part. The variation analysis procedure involves determining a first simulated force for effecting a mating between a first surface of the first part and a first surface of the second part. A first set of deformation parameters is determined by applying the first simulated force to the first surface of the first part. The finite element analysis procedure involves determining a second simulated force for effecting the mating between the two surfaces based on one or more assembly loads. A second set of deformation parameters is determined by applying the second simulated force to the first surface of the first part. Parameters such as geometric tolerances, dimensional tolerances of the mated assembly may be obtained by combining the first set of deformation parameters with the second set of deformation parameters.

ILLUSTRATIVE EMBODIMENTS

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "mating," and "assembling" may be used herein in an interchangeable manner and should be understood in the context of the disclosure. Words such as "size," "extent" and "magnitude" may also be used herein in an interchangeable manner. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 illustrates an exemplary system 100 that may be used for 3D tolerance analysis of an assembly 135 in accordance with an embodiment of the disclosure. The system 100 can include a first computer 105 that is communicatively coupled to a second computer 125 via a network 120. The network 120 may include any one or a combination of various networks such as a data network, a telephone network, a cellular network, a cable network, a wireless network, a private network, a public network, a local area network (LAN), a wide area network (WAN), and the Internet. In some instances, the network 120 may support communication technologies such as Bluetooth, cellular, near-field communication (NFC), Wi-Fi, and/or Wi-Fi direct.

The first computer 105 may in general be configured to execute operations for determining various types of tolerances associated with at least some portions of the assembly 135. The assembly 135 can be one of various types of assemblies such as, for example, an engine component of an automobile, a chassis portion of an automobile, a jet engine component for a jet aircraft, a fuselage of an aircraft, or a portion of a spacecraft. In an exemplary implementation of the embodiment, the first computer 105 can be located in any place where engineers, researchers, or scientists may design the assembly 135. For example, the first computer 105 may be located in a test facility in a foreign country or in a building that attached to a manufacturing facility. The second computer 125 may be communicatively coupled to a computer-controlled machine 130 via a communication link 133. The computer-controlled machine 130 may be located in the manufacturing facility that manufactures the assembly 135.

The second computer 125 may in general be configured to receive from the first computer 105, via the network 120, information pertaining to the assembly 135. The data can include for example, deformation parameters, tolerance parameters, manufacturing instructions, and other information pertinent to manufacturing the assembly 135. The second computer 125 may be further configured to execute operations such as, for example, to verify whether various components of the assembly 135 conform to the deformation parameters provided by the first computer 105 and to provide control signals and/or commands to the computer-controlled machine 130 for manufacturing the assembly 135.

The first computer 105 may include several components such as one or more processors and one or more memory devices. In the illustrative example shown in FIG. 1, the first computer 105 includes a processor 106, a communications module 107, and a memory 108. In one exemplary implementation of the embodiment, the processor 106 is a graphics processing unit (GPU) that executes computer-executable instructions at a high speed in order to process large amounts of data for rendering 3D images with high resolution. The computer-executable instructions may include one or more algorithms that are executed at high speed for implementing various actions in accordance with the disclosure.

The communications module 107 can be used by the first computer 105 to communicate with one or more computers such as the second computer 125. For example, the first computer 105 may utilize the communications module 107 to transfer to the second computer 125, information pertaining to the assembly 135, such as, for example, deformation parameters and manufacturing instructions.

The memory 108, which is one example of a non-transitory computer-readable medium, may be used to store an operating system 112, a database 111, and various code modules such as a 3D tolerance analysis module 109. The 3D tolerance analysis module 109 can be a code module that is executed by the processor 106 for performing tolerance analysis and/or other analysis procedures upon at least some parts of the assembly 135 in accordance with the disclosure.

The database 111 can be used to store various types of information and data such as data that may be used by the processor 106 when executing the 3D tolerance analysis module 109 and the results of one or more 3D tolerance analysis procedures executed by the processor 106.

In general, the second computer 125 may include several components such as one or more processors and one or more memory devices. In the illustrative example shown in FIG. 1, the second computer 125 includes a processor 126, a communications module 127, and a memory 128. The communications module 127 can be used to allow the second computer 125 to communicate with one or more computers such as the first computer 105. For example, the second computer 125 may utilize the communications module 127 to receive from the first computer 105, data pertaining to the assembly 135, such as, for example, deformation parameters and manufacturing instructions.

The memory 128, which is another example of a non-transitory computer-readable medium, may be used to store an operating system 132, a database 131, and various code modules such as an assembly fabrication module 129. The assembly fabrication module 129 can be a code module that is executed by the processor 126 for generating signals and/or commands that may be provided to the computer-controlled machine 130 via the communication link 133. The signals and/or commands may be used by the computer-controlled machine 130 to fabricate the assembly 135.

The database 131 can be used to store various types of information and data such as information that may be received from the first computer 105. The received information may include fabrication instructions and/or deformation parameters that the processor 126 can use when executing the assembly fabrication module 129. The database 131 can also be used to store data such as deformation parameters obtained from various sources and/or generated by one or more simulation procedures in accordance with the disclosure.

It must be understood that a memory device such as the memory 108 and the memory 128 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
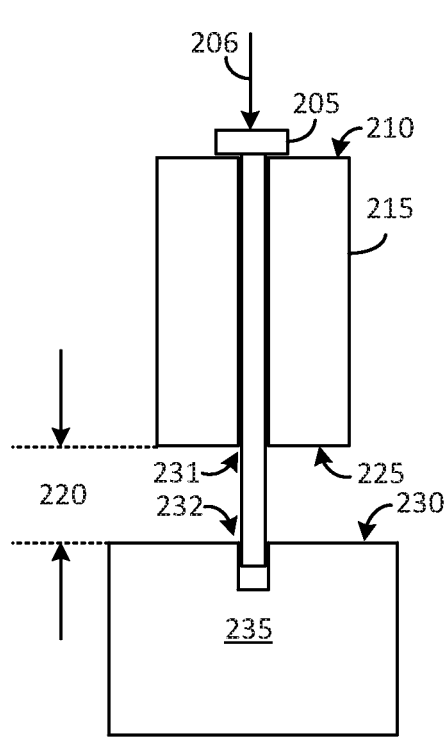
FIG. 2 illustrates a first exemplary part of the assembly that is to be mated with a second exemplary part of the assembly.

FIG. 2 illustrates an exemplary first part 215 of the assembly 135 that is to be mated with an exemplary second part 235 of the assembly 135. It must be understood that the first part 215 and the second part 235 are simplified two-dimensional (2D) cross-sectional views of 3-dimensional (3D) parts that can have complex shapes and complex mating surfaces. The simplified views are used herein in order to describe various principles and procedures in accordance with the disclosure that are applicable to various types of 3D parts. Some or all of the operations described below may be simulated in the first computer 105 by using the processor 106 to execute the 3D tolerance analysis module 109. The results of the simulation may be used to generate information that is provided to the second computer 125 via the network 120. The assembly fabrication module 129 in the second computer 125 may process and utilize the information to provide signals to the computer-controlled machine 130 for mating the first part 215 with the second part 235 when manufacturing the assembly 135.

In the exemplary configuration shown in FIG. 2, the first part 215 includes a through-hole 231 that extends from a first surface 225 of the first part 215 (alternatively referred to herein as an obverse surface) to a second surface 210 of the first part 215 (alternatively referred to herein as a reverse surface). The second part 235 includes a circular indentation 232 that is located upon a first surface 230 and is aligned with the through-hole 231 in the first part 215. The first surface 230 is alternatively referred to herein as an obverse surface of the second part 235. The circular indentation 232 may have a diameter that is substantially identical to a diameter of the through-hole 231 in the first part 215. Some or all portions of the through-hole 231 and the circular indentation 232 may be threaded.

A bolt 205 may be inserted into the through-hole 231 at the second surface 210 of the first part 215, passed through the first part 215, and engaged with the circular indentation 232 in the second part 235. For example, when the bolt 205 is a threaded bolt, a screwing operation may be utilized to pass the bolt 205 through the through-hole 231 in the first part 215 and engage with the circular indentation 232 in the second part 235. The bolt 205 enables mating of the first surface 225 of the first part 215 with the first surface 230 of the second part 235.

A gap 220 may exist between the first surface 225 of the first part 215 and the first surface 230 of the second part 235 prior to operating the bolt 205 to mate the first surface 225 of the first part 215 with the first surface 230 of the second part 235. Various parameters associated with the operation of mating the first part 215 with the second part 235 can include for example, a magnitude of the gap 220 and an amount of force 206 that may be applied to the bolt 205 when moving the first part 215 towards the second part 235. When the bolt 205 is a threaded bolt, the force 206 may be characterized in part by a torque that is applied for moving the bolt 205 through the through-hole 231 in the first part 215 and into the circular indentation 232 in the second part 235.

The amount of force 206 that may be applied in order to close the gap 220 and place the first surface 225 of the first part 215 in contact with the first surface 230 of the second part 235 may be determined by a recursive trial-and-error process. For example, if the gap 220 is 20 microns and the application of an amount of force 206 equal to 10 kN reduces the gap 220 to 15 microns, a determination may be made that the amount of force 206 should be increased to a value in order to reduce the gap 220 to less than 15 microns. Accordingly, an estimate may be made to increase the amount of force 206 to 30 kN. Upon application of the 30 kN amount of force 206 it may be found that the gap 220 is about 8 microns. The size of the gap 220 (8 microns) may be deemed unacceptable and so another estimate is made to increase the amount of force 206 to 50 kN. Upon application of the 50 kN amount of force 206 it may be found that the gap 220 no longer exists and that the first surface 225 of the first part 215 is in contact with the first surface 230 of the second part 235. However, the estimate made to increase the amount of force 206 to 50 kN may have been overly aggressive because the second surface 210 of the first part 215 and/or some internal portions of the first part 215 has been deformed upon application of the 50 kN. Consequently, a revision is made and the amount of force 206 is changed to 45 kN. Upon application of the 45 kN amount of force 206 it may be found that the first surface 225 of the first part 215 is in contact with the first surface 230 of the second part 235 and the extent of deformation of the second surface 210 of the first part 215 is reduced in comparison to the use of the 50 kN amount of force 206. However, this reduced amount of deformation may still be deemed unacceptable, and further attempts may be made to determine an amount of force 206 that is suitable to place the first surface 225 of the first part 215 in contact with the first surface 230 of the second part 235 with an acceptable level of deformation in the second surface 210 of the first part 215, or separated from the first surface 230 of the second part 235 by an acceptable amount.

The acceptable level of deformation in the second surface 210 of the first part 215 may vary for different applications and may also vary based on the nature of the components that are mated together. For example, in a first exemplary application, the first part 215 may be a flat metal bar that is attached to a seat frame inside an automobile (the seat frame is the second part 235 in this example). Upholstery for the seat may then be mounted upon the metal bar. The location at which the bar is attached to the seat frame may be now hidden under the upholstery. Accordingly, it may be determined that a certain amount of deformation of the flat metal bar that may occur at that location on the seat frame may be acceptable. However, the same amount of deformation may be unacceptable when the first part 215 and the second part 235 are located, for example, inside a semiconductor chip.

The recursive simulation procedure described above to determine various parameters (such as an appropriate amount of force 206, an acceptable level of deformation in the second surface 210 of the first part 215, and an acceptable amount of the gap 220) may be impractical, time-consuming, and monetarily expensive if carried out upon real-world components on a factory floor, for example. Furthermore, real-world components typically have non-ideal shapes and/or various manufacturing tolerances. For example, in one case, the first part 215 may have a +/−5% tolerance and the second part 235 may have a +/−20% tolerance. The amount of gap 220 and/or deformation of the second surface 210 of the first part 215 may turn out significantly different between a first mating procedure and one or more subsequent mating procedures.

In the exemplary embodiment described above the first part 215 is mated with the second part 235 by using a bolt 205 and various characteristics may be evaluated by using various estimates associated with factors such as the amount of force 206 to be applied to the bolt 205, the magnitude of the gap 220, the amount of deformation of the second surface 210 of the first part 215. In other exemplary embodiments, the first part 215 may be mated with the second part 235 using components and procedures that may not include the use of the bolt 205. For example, one or more components such as clamps, springs, clips, rings, straps, and braces may be used and/or one or more procedure such as a welding procedure, a press-fitting procedure, a clamping procedure may be used for mating the first part 215 with the second part 235. These various procedures may be simulated on a computer so as to avoid the handicaps associated with testing real-world parts.

Figure 3:
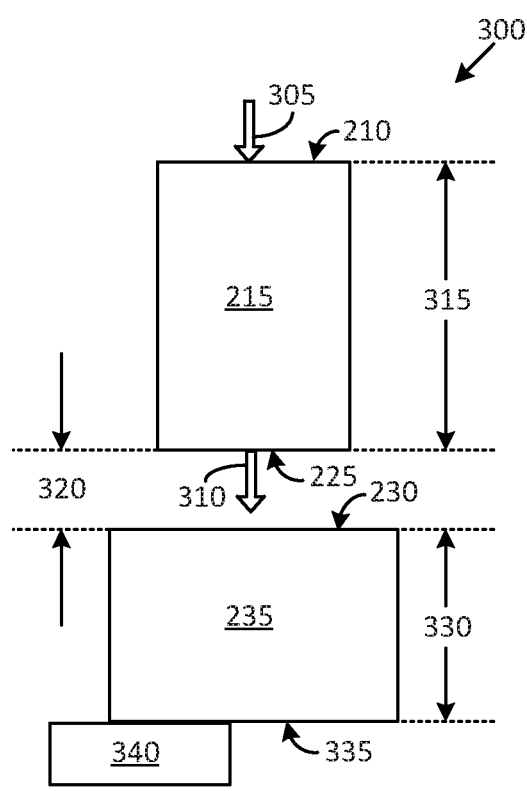
FIG. 3 shows a simulated model of the exemplary first part and the exemplary second part on a computer in accordance with an embodiment of the disclosure.

FIG. 3 shows a simulated model 300 of the first part 215 and the second part 235 rendered on a display screen of a computer such as the first computer 105. A code module such as the 3D tolerance analysis module 109 may be executed by the processor 106 for rendering the simulated model 300 on the display screen of the first computer 105. Typically, the simulated model 300 is rendered in the form of one or more mesh objects having polygonal vertices, edges, and faces that define 3D shapes matching real-world parts. For example, if the first part 215 is a cube-shaped prismatic part, the simulated model 300 may include a 3D mesh object resembling the first part 215.

Unlike the first part 215 that has various physical properties, the 3D mesh object can be manipulated, such as by applying various types of forces to drag a surface or a corner in one or more of various directions. For example, a simulated action executed upon the simulated model 300 may involve applying a simulated force 305 upon the second surface 210 of the first part 215 in order to move the first surface 225 towards the first surface 230 of the second part 235.

The magnitude of the simulated force 305 determines how far the first part 215 moves towards the second part 235. For example, the simulated action may involve simulating an application of 20 kN upon the second surface 210 of the first part 215 by using a hydraulic press on a factory floor. The gap 220 (shown in FIG. 1), which for example, was 20 microns may be reduced to the gap 320 having 10 microns based on the magnitude of the simulated force 305 exerted upon the second surface 210 of the first part 215.

The action of applying the simulated force 305 upon the second surface 210 of the first part 215 in order to move the first surface 225 towards the first surface 230 of the second part 235 may be equivalently replicated in an alternative simulated action. The alternative simulated action involves associating the first surface 225 of the first part 215 with a simulated force 310 that pulls the first surface 225 of the first part 215 towards the first surface 230 of the second part 235 without causing deformation in the first surface 225 of the first part 215 and any other portion of the first part 215 (including an internal structure of the first part 215 and the second surface 210 of the first part 215. Executing such a pulling action without causing any distortion in the first part 215 may be impractical to replicate on a factory floor.

A conventional tolerance variation analysis procedure may be executed for determining a first set of deformation parameters when the first surface 225 of the first part 215 is mated to the first surface 230 of the second part 235. Various factors that may contribute to the first set of deformation parameters can include manufacturing tolerances in the first part 215 and/or the second part 235. For example, the first part 215 may have a dimension 315 that is permitted to have a 10% manufacturing tolerance. Consequently, the gap 320 may vary by +/−10%. The second part 235 may have a dimension 330 that is also permitted to have a 10% manufacturing tolerance. Consequently, a tolerance value of the gap 320 may be affected by a combination of the manufacturing tolerance of the dimension 315 and the dimension 330.

The tolerance value of the gap 320 may be further affected by manufacturing tolerances that may be present in other parts that are associated with the first part 215 and/or the second part 235. For example, a third part 340 that abuts a second surface 335 of the second part 235 may have manufacturing tolerances that affect the second part 235, which in turn may affect the tolerances values of the gap 320. The effects of one or more of the various manufacturing tolerances and other types of tolerances (bending tolerance, assembly tolerance etc.) may be simulated by using the tolerance variation analysis procedure. The tolerance variation analysis procedure may also be used for simulating the application of the simulated force 305.

Figure 4:
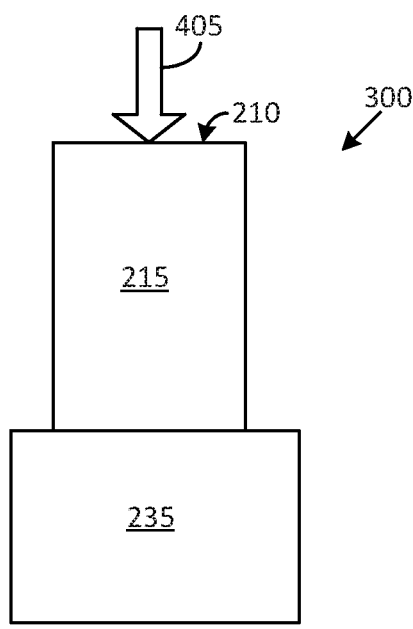
FIG. 4 shows the simulated model with a first simulated force applied to a surface of the exemplary first part in accordance with an embodiment of the disclosure.

FIG. 4 shows the simulated model 300 with a simulated force 405 applied upon the second surface 210 of the first part 215 in accordance with a conventional tolerance variation analysis procedure. The magnitude of the simulated force 405, which is larger than that of the simulated force 305 shown in FIG. 3, is selected on the basis of a recursive simulation procedure (as described above) to place the first surface 225 of the first part 215 in contact with the first surface 230 of the second part 235. In this exemplary case, the magnitude of the simulated force 405 does not cause a deformation in the first part 215 or the second part 235.

However, determining the magnitude of the simulated force 405 may include the use of a recursive simulation procedure that can be time-consuming and expensive. The recursive simulation procedure may involve setting the simulated force 405 to a magnitude that may lead to deformation in the first part 215 and/or the second part 235.

Figure 5:
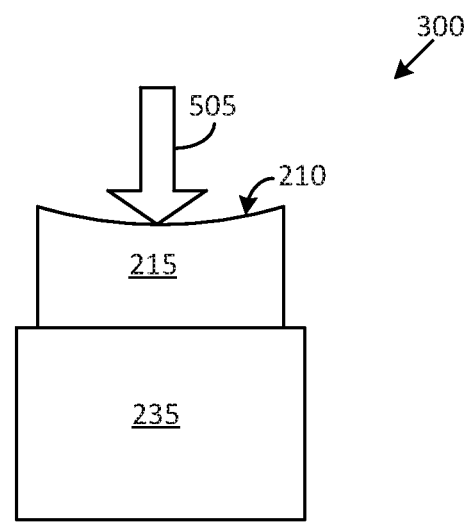
FIG. 5 shows the simulated model with a second simulated force applied to a surface of the exemplary first part in accordance with an embodiment of the disclosure.

FIG. 5 shows the simulated model 300 with a simulated force 505 applied upon the second surface 210 of the first part 215 as a part of a recursive simulation procedure in accordance with a conventional tolerance variation analysis procedure. The magnitude of the simulated force 505, which is larger than that of the simulated force 405 shown in FIG. 4, leads to a deformation in the second surface 210 of the first part 215. The use of the conventional tolerance variation analysis procedure that may include such a deformation may be acceptable in some applications such as when the first part 215 is a sheet metal part and the gap 320 (shown in FIG. 3) is of the order of a few millimeters, for example. The extent of the deformation may be acceptable if encountered in a factory floor or is present in a finished product. However, the deformation may be unacceptable in some other applications, such as when the first part 215 is a prismatic part and the assembly 135 has tight deformation parameters such as manufacturing tolerances and/or gap tolerances of the order of a few microns.

Figure 6:
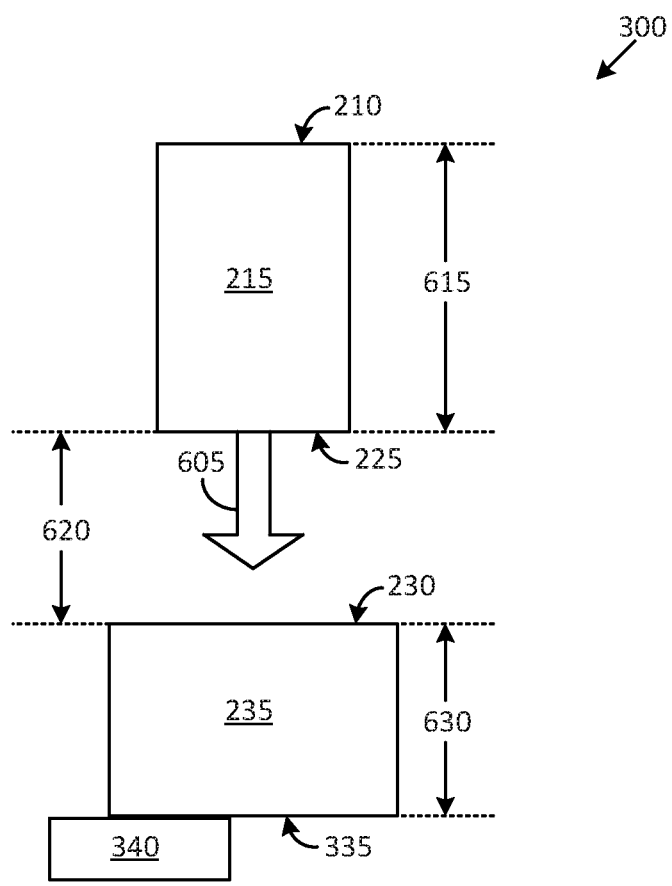
FIG. 6 shows the simulated model with a simulated force applied to a surface of the exemplary first part in a tolerance variation analysis procedure executed in accordance with the disclosure.

FIG. 6 shows the simulated model 300 with a simulated force 605 applied to the first surface 225 of the first part 215 in a tolerance variation analysis procedure executed in accordance with the disclosure. The first part 215 can be a first prismatic part having a thickness 615 (as shown in FIG. 6) and the second part 235 can be a second prismatic part having a thickness 630 (as shown in FIG. 6). The first part 215 is separated from the second part 235 by a gap 620 prior to application of the simulated force 605. Determining one or more characteristics of the simulated force 605 to be applied can include determining where to apply the simulated force 605 and a magnitude of the simulated force 605. In the illustrated exemplary implementation, the simulated force 605 is applied to the first surface 225 of the first part 215. In an alternative implementation of the tolerance variation analysis procedure in accordance with the disclosure, the simulated force 605 may be applied to the first surface 230 of the second part 235 in lieu of, or in addition to, applying the simulated force 605 to the first surface 225 of the first part 215. When applied to the first surface 230 of the second part 235, the simulated force is directed at bringing the first surface 230 of the second part 235 closer to, or in contact with, the first surface 225 of the first part 215.

In one exemplary implementation in accordance with the disclosure, the magnitude of the simulated force 605 may be determined without applying a recursive simulation process as may be done in a conventional tolerance variation analysis procedure. For example, apriori information or knowledge may be used to set the magnitude of the simulated force 605 to a value that will ensure placing the first surface 225 of the first part 215 in contact with the first surface 230 of the second part 235. The apriori information or knowledge may be based on one or more factors such as theoretical calculations and/or data sheets related to the first part 215 and/or the second part 235.

In another exemplary implementation, the magnitude of the simulated force 605 may be determined by using an estimated value that when applied to the second surface 210 of the first part 215 eliminates the gap 620 and places the first part 215 in contact with the first surface 230 of the second part 235 accompanied by a deformation of the second surface 210 and/or other portions of the first part 215. For example, the estimated value may correspond to a magnitude of the simulated force 505 that is applied to the second surface 210 of the first part 215 (as shown in FIG. 5). However, unlike the deformation of the second surface 210 and/or other portions of the first part 215 that occurs upon application of the simulated force 505 to the second surface 210 (a "pushing" action, as illustrated in FIG. 5), application of the simulated force 605 to the first surface 225 of the first part 215 (a "pulling" action, as illustrated in FIG. 6) does not lead to deformation on the second surface 210 and/or other portions of the first part 215. Consequently, the magnitude of the simulated force 605 can be set to a first value (such as, equal to, or exceeding, the magnitude of the simulated force 505) without taking into consideration one or more deformation parameters. The first value can be a fixed value that does not require the use of a recursive simulation procedure, and allows for execution of a VSA procedure in accordance with the disclosure. Eliminating the recursive simulation procedure leads to a significant reduction in simulation time and time-to-manufacture of the assembly 135 in comparison to a traditional tolerance variation analysis procedure involving application of a force upon the second surface 210 of the first part 215 and distortion that may occur as a result of the application of the simulated force 305 upon the second surface 210.

Figure 7:
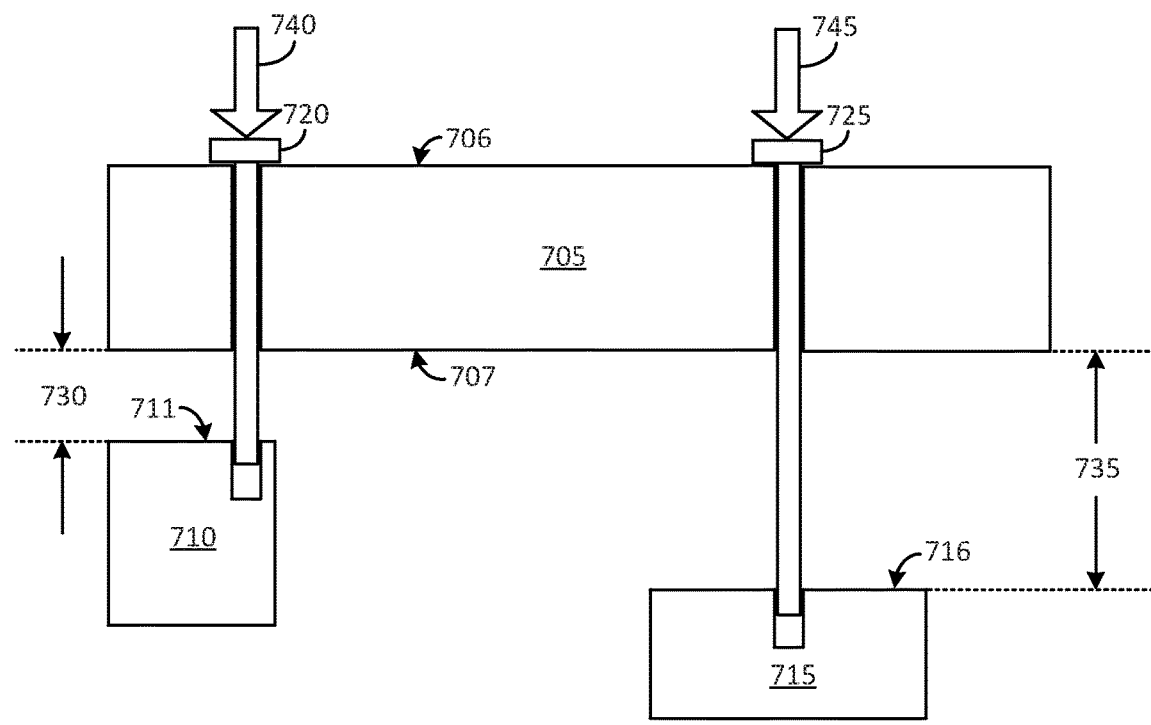
FIG. 7 shows an exemplary configuration where a first part is to be mated at a first location with a second part and at a second location with a third part.

FIG. 7 shows an exemplary configuration where a first part 705 is to be mated with a second part 710 and a third part 715. The mating of the first exemplary part 705 with the second exemplary part 710 may be executed by applying a force 740 upon a bolt 720. The bolt 720 may be passed through the first part 705 and engaged with an indentation in the second part 710. A gap 730 that exists between a surface 707 of the first part 705 and a first surface 711 of the second part 710 has to be substantially eliminated in order to place the surface 707 of the first part 705 in contact with the first surface 711 of the second part 710. The magnitude of the gap 730 may vary from this exemplary configuration to one or more identical configurations based on variations in the geometric tolerances and/or dimensional tolerances in one or both of the first part 705 and the second part 710 as well as any other parts that may be placed in contact with either the first part 705 or the second part 710.

The mating of the first exemplary part 705 with the exemplary third part 715 may be executed by applying a force 745 upon a bolt 725. The bolt 725 may be passed through the first part 705 and engaged with an indentation in the third part 715. A gap 735 that exists between the surface 707 of the first part 705 and a first surface 716 of the third part 715 has to be substantially eliminated in order to place the surface 707 of the first part 705 in contact with the first surface 716 of the third part 715. The magnitude of the gap 735 may vary from this exemplary configuration to one or more identical configurations based on variations in the geometric tolerances and/or dimensional tolerances in one or both of the first part 705 and the third part 715 as well as any other parts that may be placed in contact with either the first part 705 or the third part 715. The magnitude of the gap 735 is more than the magnitude of the gap 730. Consequently, the magnitude of the force 745 has to be greater than a magnitude of the force 740 for placing the surface 707 of the first part 705 in contact with the first surface 716 of the third part 715.

Figure 8:
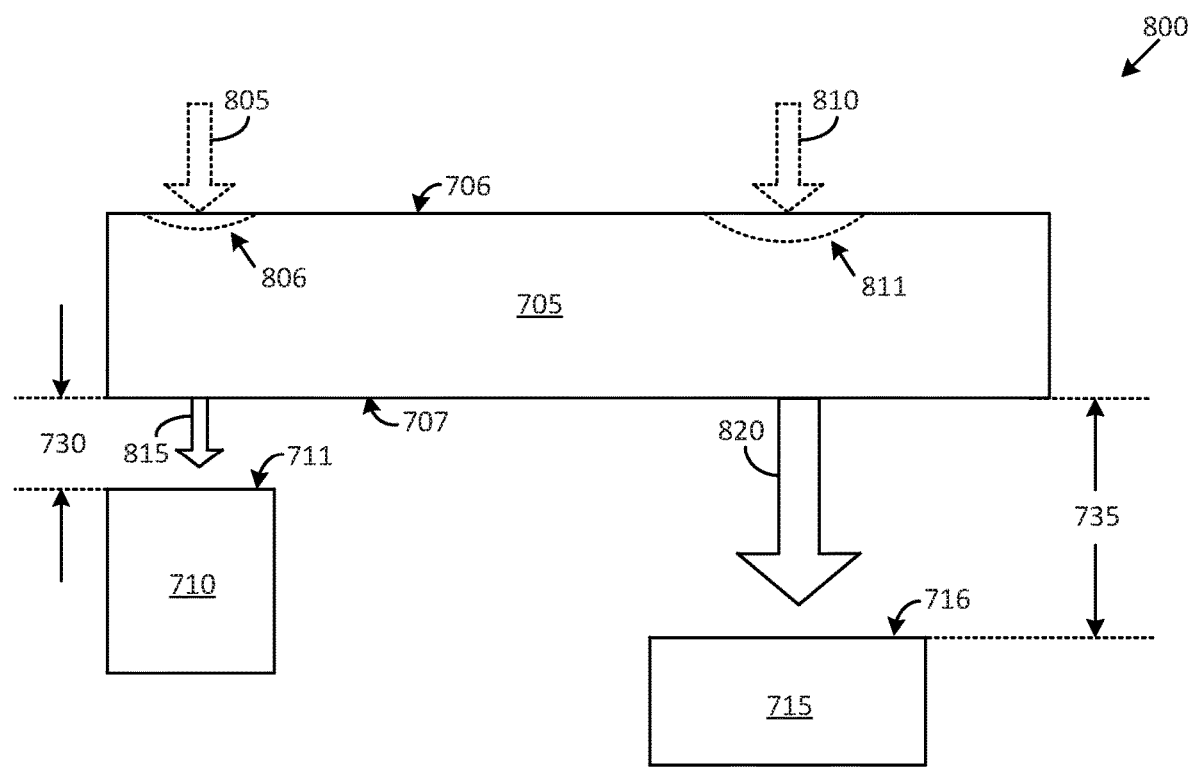
FIG. 8 shows a simulated model of the exemplary configuration shown in
FIG. 7.

FIG. 8 shows a simulated model 800 of the exemplary configuration shown in FIG. 7. The simulated model 800 may be used to execute various types of tolerance analysis procedures. The description below provides a comparison between a conventional tolerance variation analysis procedure and a tolerance variation analysis procedure in accordance with the disclosure. The conventional tolerance variation analysis procedure may be executed by applying a first simulated force 805 at a first location upon a surface 706 of the first part 705 and a second simulated force 810 at a second location upon the surface 706 of the first part 705. The first location may correspond to a location of the bolt 720 and the second location may correspond to a location of the bolt 725.

The traditional tolerance variation analysis procedure may be used to determine a magnitude of the first simulated force 805 to place the surface 707 of the first part 705 in contact with the first surface 711 of the second part 710. The magnitude of the first simulated force 805 required to place the surface 707 of the first part 705 in contact with the first surface 711 of the second part 710 may be determined on the basis of a magnitude of the gap 730 and by using a recursive simulation procedure. The recursive simulation procedure involves adjusting the magnitude of the first simulated force 805 during each simulation run based on data derived from one or more previous simulation runs.

Application of the first simulated force 805 upon the surface 706 of the first part 705 may cause a deformation 806 in the surface 706 of the first part 705 and/or in internal portions of the first part 705. In some cases, the deformation 806 may be deemed acceptable if it were to occur in the real-world assembly. For example, when the first part 705 is a metal sheet that is attached to a chassis portion (second part 710), a dent in the metal sheet may be deemed acceptable for one or more reasons.

The traditional tolerance variation analysis procedure may be further used to determine a magnitude of the second simulated force 810 to place the surface 707 of the first part 705 in contact with the first surface 716 of the third part 715. Application of the second simulated force 810 upon the surface 706 of the first part 705 may cause a deformation 811 in the surface 706 of the first part 705 and/or in internal portions of the first part 705. A magnitude of the deformation 811, which is directly dependent upon the magnitude of the gap 735, is greater than a magnitude of the deformation 806 because the magnitude of the second simulated force 810 is greater than the magnitude of the first simulated force 805. In some cases, the deformation 811 may be deemed acceptable if it were to occur in the real-world assembly.

However, in some other cases, one or both of the deformation 806 and the deformation 811 may be deemed unacceptable and it would be desirable to carry out a tolerance variation analysis procedure that is independent of the magnitude of the gap 730 and the magnitude of the gap 735. Providing independence with respect to gap sizes can desirably provide information regarding tolerances in various parts of the assembled product based on the simulated model 800. Accordingly, a tolerance variation analysis procedure in accordance with the disclosure involves dispensing with the use of the first simulated force 805 that is applied to the surface 706 of the first part 705 based on the magnitude of the gap 730 and the second simulated force 810 that is applied to the surface 706 of the first part 705 based on the magnitude of the gap 735.

A first simulated force 815 may be selected in one exemplary implementation in accordance with the disclosure on the basis of apriori information and is independent of the magnitude of the gap 730. In another exemplary implementation in accordance with the disclosure, the first simulated force 815 may be determined on the basis of a size of the gap 730. In some cases, the magnitude of the first simulated force may be an estimate based on the size of the gap 730. The first simulated force 815 is applied to the surface 707 of the first part 705 for eliminating the gap 730 and placing the surface 707 of the first part 705 in contact with the first surface 711 of the second part 710. The characteristics of the deformation 806 that may occur in the surface 706 of the first part 705 and/or in internal portions of the first part 705 is dependent on various deformation parameters associated with the first part 705, the second part 710 and any other part that may be in contact with either first part 705 or second part 710. Furthermore, the characteristics of the deformation 806 are independent of the magnitude of the gap 730. In one exemplary application, one or both of the first part 705 and the second part 710 may be a prismatic part (or a sheet) and the magnitude of the gap 730 may be of the order of a few microns. It may be desirable in this exemplary application to preclude the magnitude of the gap 730 when evaluating tolerances.

A second simulated force 820 may be selected in one exemplary implementation in accordance with the disclosure on the basis of apriori information and is independent of the magnitude of the gap 735. In another exemplary implementation in accordance with the disclosure, the second simulated force 820 may be determined on the basis of a size of the gap 735. In some cases, the magnitude of the first simulated force may be an estimate based on a size of the gap 735 and can be considerably greater than the force 745 described above with respect to FIG. 7 because any deformation that may occur upon the surface 706 of the first part 705 is substantially independent of the magnitude of the second simulated force 820. The second simulated force 820 is applied to the surface 707 of the first part 705 for eliminating the gap 735 and placing the surface 707 of the first part 705 in contact with the first surface 716 of the third part 715. In one exemplary implementation, the second simulated force 820 may be applied at a location on the surface 707 that is separated by a separation distance from another location on the surface 707 upon which the first simulated force 815 is applied. In another exemplary implementation, the second simulated force 820 may be the same as the first simulated force 815 and a single simulated force 905 (shown in FIG. 9) may be applied at any location on the surface 707 of the first part 705.

The characteristics of the deformation 811 that may occur in the surface 706 of the first part 705 and/or in internal portions of the first part 705 is dependent on various deformation parameters associated with the first part 705, the third part 715 and any other part that may be in contact with either the first part 705 (such as the second part 710) or the third part 715. Furthermore, the characteristics of the deformation 811 are independent of the magnitude of the gap 735. In one exemplary application, one or both of the first part 705 and the third part 715 may be a prismatic part (or a sheet) and the magnitude of the gap 735 may be of the order of a few microns. It may be desirable in this exemplary application to preclude the magnitude of the gap 735 when evaluating tolerances.

Tolerance analysis carried out upon the simulated model 800 by executing the tolerance variation analysis procedure described above can be further carried out by using a finite element analysis (FEA) procedure in accordance with the disclosure.

In an exemplary implementation of the FEA procedure in accordance with the disclosure, the first simulated force 815 can be selected on the basis of one or more assembly loads. The assembly loads may be determined on the basis of various characteristics of the second part 710 (such as weight, deformation parameters, type of material, and nature of the first surface 711) and/or on the basis of a desired type of joint between the second part 710 and the first part 705. The assembly loads may also be experimentally selected during run time of the FEAs procedure. The second simulated force 820 can be also selected on the basis of one or more assembly loads. The assembly loads may be determined on the basis of various characteristics of the third part 715 (such as weight, deformation parameters, type of material, and nature of the first surface 716) and/or on the basis of a desired type of joint between the third part 715 and the first part 705. The assembly loads may also be experimentally selected during run time of the FEA procedure. The FEA procedure can be used in conjunction with the tolerance variation analysis procedure for evaluating various deformation characteristics of the first part 705, the second part 710, and/or the third part 715.

Figure 9:
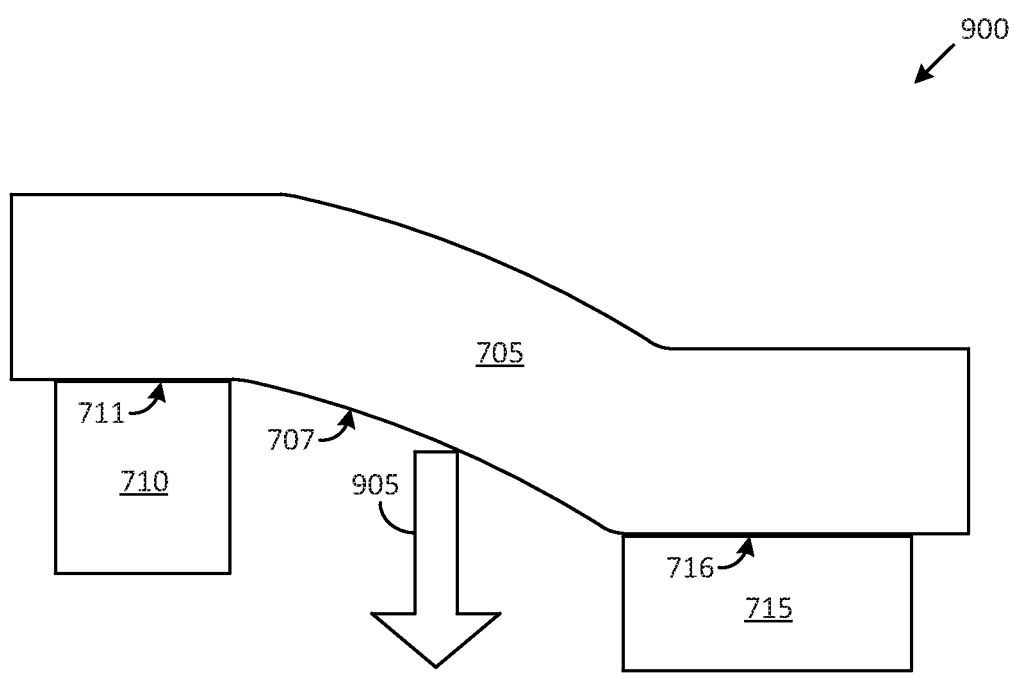
FIG. 9 shows an assembly that can be generated based on the simulated model shown in FIG. 8.

FIG. 9 shows an assembly 900 that can be manufactured based on the simulated model 800. The surface 707 of the first part is in contact with the first surface 711 of the second part 710 and the first surface 716 of the third part 715. The simulated model 800 provides information pertaining to deformation parameters in various assemblies that replicate the assembly 900.

Figure 10:
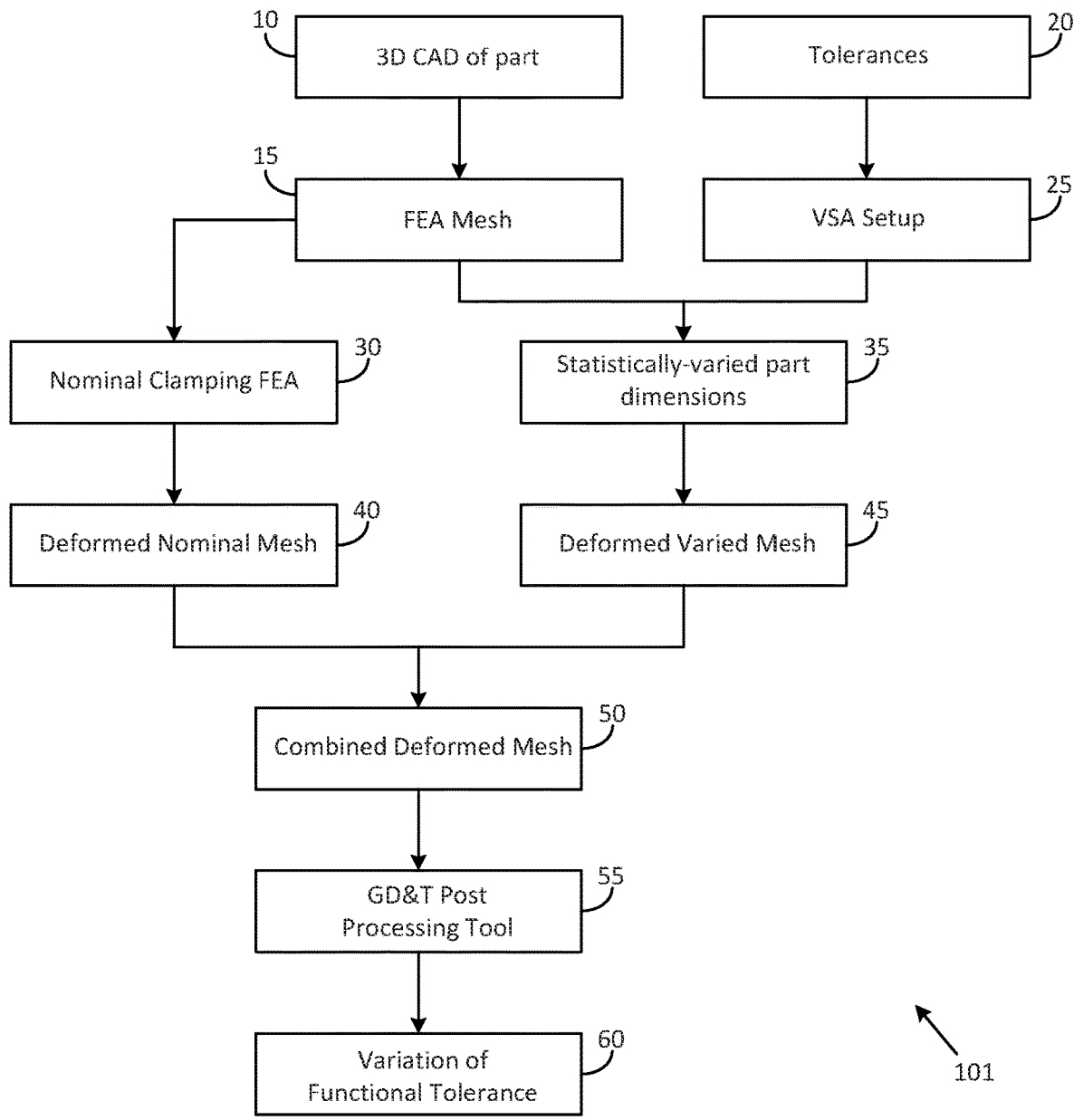
FIG. 10 illustrates a flowchart of an exemplary method for tolerance analysis in accordance with the disclosure.

FIG. 10 is a flowchart 101 of an exemplary method for tolerance analysis of an assembly in accordance with the disclosure. The flowchart 101 illustrates a sequence of operations that can be implemented in hardware, software, or a combination thereof. In the context of software, the operations represent computer-executable instructions stored on one or more non-transitory computer-readable media such as the memory 108 and the memory 128, that, when executed by one or more processors, such as the processor 106 and the processor 126 respectively, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 101 may be carried out by using an application such as the 3D tolerance analysis module 109 that is stored in the memory 108 of the first computer 105.

At block 10, a 3D computer-aided design (CAD) diagram of one or more parts may be obtained. At block 15, the CAD diagram may be used to generate a simulated model in the form of a FEA mesh, on the display screen of the first computer 105. The simulated model 800 will be used from hereon as an example for describing various other blocks of the flowchart 101.

At block 20, various deformation parameters of the first part 705, the second part 710, and the third part 715 that are included in the CAD diagram may be obtained from various sources such as manufacturer data sheets and/or specifications. At block 25, the deformation parameters may be used to generate a graphical rendering of the first part 705, the second part 710, and the third part 715 for executing a tolerance variation analysis procedure. At block 35, the deformation parameters may be applied to the FEA mesh (block 15). At block 35, a set of statistically-varied part dimensions may be used as a part of the tolerance variation analysis procedure. In an exemplary implementation, the tolerance variation analysis procedure may be executed by using a first set of statistically-varied part dimensions of the first part 705 (shown in FIG. 8), a second set of statistically-varied part dimensions of the second part 710, and/or a third set of statistically-varied part dimensions of the third part 715. In some cases, the tolerance variation analysis procedure may include Monte Carlo runs. At block 45, the execution of the tolerance variation analysis procedure can generate a number of meshes, each mesh associated with a deformation (such as the deformation 806 and the deformation 811 shown in FIG. 8).

At block 30, the FEA mesh (block 15) may be used for application of one or more nominal forces such as, for example, the first simulated force 815 and the simulated force 820 shown in FIG. 8. The nominal force is selected without using a recursive simulation procedure. In one exemplary case, the second simulated force 820 can be a nominal force that significantly exceeds a magnitude that is estimated for eliminating the gap 735 and placing the surface 707 of the first part 705 in contact with the first surface 716 of the third part 715. For example, if an estimated force level of 20 kN is deemed adequate to eliminate the gap 735, a force of 50 kN may be selected as a nominal clamping force for the FEA procedure.

At block 40, the application of the nominal force generates a deformed nominal mesh. At block 50, the deformed nominal mesh that has been generated by using the FEA procedure may be combined with the deformed meshes generated by using the tolerance variation analysis procedure (block 45) to generate a combined deformed mesh. At block 55, a Geometric Dimensioning and Tolerancing (GD&T) tool may be used to process the combined deformed mesh and at block 60, one or more functional tolerance variations of the assembly may be evaluated.

The exemplary method illustrated by the flowchart 101 can be used to predict any assembly build problems before making any physical parts or building an assembled product on a factory floor. Combining the tolerance variation analysis procedure with the FEA procedure allows analysis of various design features and tolerances by highlighting the sources and degrees of dimensional variation. Combining the tolerance variation analysis procedure with the FEA procedure can also help improve design quality and eliminate expensive prototypes while reducing labor, tooling, and metrology costs on the factory floor.

EXAMPLE EMBODIMENTS

In some instances, the following examples may be implemented together or separately by the systems and methods described herein.

Example 1 may include a computer-implemented method for tolerance analysis, the method comprising: executing a variation analysis procedure to determine a first set of deformation parameters when a first part is mated with a second part, the variation analysis procedure comprising: determining a first simulated force for placing a first surface of the first part in contact with a first surface of the second part, based at least in part on a magnitude of a gap between the first surface of the first part and the first surface of the second part; determining the first set of deformation parameters based on applying the first simulated force to at least the first surface of the first part; and storing the first set of deformation parameters in a database; executing a finite element analysis procedure to determine a second set of deformation parameters when the first part is mated with the second part, the finite element analysis procedure comprising: determining a second simulated force based on one or more assembly loads; determining the second set of deformation parameters based on applying the second simulated force to at least the first surface of the first part; and storing the second set of deformation parameters in the database; retrieving from the database, the first set of deformation parameters and the second set of deformation parameters; and determining one or more of geometric tolerances, dimensional tolerances, and a deformation of the first part when mated with the second part, by combining the first set of deformation parameters with the second set of deformation parameters.

Example 2 may include the computer-implemented method of example 1 and/or some other example herein, wherein the first part is a prismatic part and the first simulated force is applied to the first surface of the prismatic part for effecting a mating between the first surface of the prismatic part and the first surface of the second part.

Example 3 may include the computer-implemented method of example 2 and/or some other example herein, wherein the first simulated force is applied at a first location upon the first surface of the prismatic part and the second simulated force is applied at a second location upon the first surface of the prismatic part, the first location separated from the second location by a separation distance.

Example 4 may include the computer-implemented method of example 1 and/or some other example herein, wherein the first part is one of a first prismatic part, a first sheet, or includes at least a first non-planar surface and the second part is one of a second prismatic part, a second sheet, or includes at least a second non-planar surface.

Example 5 may include the computer-implemented method of example 4 and/or some other example herein, wherein the first simulated force is applied at a first location upon the first non-planar surface and the second simulated force is applied at a second location upon the second non-planar surface, the first location separated from the second location by a separation distance.

Example 6 may include the computer-implemented method of example 1 and/or some other example herein, wherein the first simulated force is applied at a first location upon the first surface of the first part and the second simulated force is applied at a second location upon the first surface of the first part, the first location separated from the second location by a separation distance.

Example 7 may include the computer-implemented method of example 1 and/or some other example herein, wherein the first simulated force and the second simulated force is applied at a first location upon the first surface of the first part for effecting a mating between the first surface of the first part and the first surface of the second part.

Example 8 may include the computer-implemented method of example 1 and/or some other example herein, wherein the one or more assembly loads are one or more selected assembly loads.

Example 9 may include a computer-implemented method for tolerance analysis, the method comprising: executing a variation analysis procedure to determine a first set of deformation parameters when a first part is mated with a second part, the variation analysis procedure comprising: determining a first simulated force for effecting a mating between an obverse surface of the first part and an obverse surface of the second part, based at least in part on a magnitude of a gap between the obverse surface of the first part and the obverse surface of the second part; applying the first simulated force upon the obverse surface of the first part for effecting the mating between the obverse surface of the first part and the obverse surface of the second part; determining the first set of deformation parameters based on applying the first simulated force upon the obverse surface of the first part; and storing the first set of deformation parameters in a database; executing a finite element analysis procedure to determine a second set of deformation parameters when the obverse surface of the first part is mated with the obverse surface of the second part, the finite element analysis procedure comprising: determining a second simulated force for effecting the mating between the obverse surface of the first part and the obverse surface of the second part based on one or more assembly loads; applying the second simulated force upon the obverse surface of the first part for effecting the mating between the obverse surface of the first part and the obverse surface of the second part; determining the second set of deformation parameters based on applying the second simulated force upon the obverse surface of the first part; and storing the second set of deformation parameters in the database; retrieving from the database, the first set of deformation parameters and the second set of deformation parameters; and obtaining one or more of geometric tolerances, dimensional tolerances, and a deformation of the first part when mated with the second part, by processing at least one of the first set of deformation parameters or the second set of deformation parameters.

Example 10 may include the computer-implemented method of example 9 and/or some other example herein, wherein the first part is one of a first prismatic part, a first sheet, or includes at least a first non-planar surface and wherein determining the second simulated force for effecting the mating between the obverse surface of the first prismatic part and the obverse surface of the second part comprises selecting a nominal simulated force.

Example 11 may include the computer-implemented method of example 10 and/or some other example herein, wherein the second part is one of a second prismatic part, a second sheet, or includes at least a second non-planar surface.

Example 12 may include the computer-implemented method of example 9 and/or some other example herein, wherein the first simulated force is applied at a first location upon the obverse surface of the first part and the second simulated force is applied at a second location upon the obverse surface of the first part, the first location separated from the second location by a separation distance.

Example 13 may include the computer-implemented method of example 12 and/or some other example herein, wherein determining the second set of deformation parameters based on applying the second simulated force to the obverse surface of the first part comprises determining an amount of deformation in at least one of a reverse surface of the first part or an internal portion of the first part.

Example 14 may include the computer-implemented method of example 9 and/or some other example herein, wherein the first simulated force is applied at a first location upon the obverse surface of the first part for effecting the mating between the obverse surface of the first part and the obverse surface of the second part.

Example 15 may include the computer-implemented method of example 14 and/or some other example herein, wherein the first part is one of a first prismatic part, a first sheet, or includes at least a first non-planar surface and the second part is one of a second prismatic part, a second sheet, or includes at least a second non-planar surface.

Example 16 may include a computer-implemented method for tolerance analysis, the method comprising: rendering a finite element analysis (FEA) mesh of one or more parts of an assembly on a display screen of a computer; generating a nominal deformed mesh by applying a nominal simulated force upon a first surface of a first part for placing the first surface of the first part in contact with at least a first surface of a second part; generating a graphical rendering of at least the first part and the second part for executing a variation analysis procedure; generating a set of deformed meshes by executing a set of statistically-varied part dimensions upon one or both of the graphical rendering and the FEA mesh; combining the set of deformed meshes with the nominal deformed mesh to generate a combined deformed mesh; and determining one or more of geometric tolerances and dimensional tolerances of the assembly by evaluating the combined deformed mesh.

Example 17 may include the computer-implemented method of example 16 and/or some other example herein, wherein the first part is a prismatic part and the nominal simulated force is applied to the first surface of the prismatic part for effecting a mating between the first surface of the prismatic part and the first surface of the second part.

Example 18 may include the computer-implemented method of example 16 and/or some other example herein, wherein a magnitude of the nominal simulated force is selected for effecting a mating between the first surface of the first part and the first surface of the second part.

Example 19 may include the computer-implemented method of example 16 and/or some other example herein, wherein the first part is one of a first prismatic part, a first sheet, or includes at least a first non-planar surface and the second part is one of a second prismatic part, a second sheet, or includes at least a second non-planar surface.

Example 20 may include the computer-implemented method of example 16 and/or some other example herein, wherein executing the set of statistically-varied part dimensions upon one or both of the graphical rendering and the FEA mesh is a part of the variation analysis procedure.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments. Although certain aspects of various embodiments may have been described using a singular word or phrase (such as "a signal" or "a processor") it should be understood that the description may be equally applicable to plural words or phrases (such as "signals" and "processors").

That which is claimed is:

1. A computer-implemented method for tolerance analysis, the method comprising:
    executing a variation analysis procedure to determine a first set of deformation parameters when a first part is mated with a second part, the variation analysis procedure comprising:
        determining a first simulated force for placing a first surface of the first part in contact with a first surface of the second part, based at least in part on a magnitude of a gap between the first surface of the first part and the first surface of the second part;
        determining the first set of deformation parameters based on applying the first simulated force to at least the first surface of the first part; and
        storing the first set of deformation parameters in a database;
    executing a finite element analysis procedure to determine a second set of deformation parameters when the first part is mated with the second part, the finite element analysis procedure comprising:
        determining a second simulated force based on one or more assembly loads;
        determining the second set of deformation parameters based on applying the second simulated force to at least the first surface of the first part; and
        storing the second set of deformation parameters in the database;
    retrieving from the database, the first set of deformation parameters and the second set of deformation parameters; and
    determining one or more of geometric tolerances, dimensional tolerances, and a deformation of the first part when mated with the second part, by combining the first set of deformation parameters with the second set of deformation parameters.

2. The computer-implemented method of claim 1, wherein the first part is a prismatic part and the first simulated force is applied to the first surface of the prismatic part for effecting a mating between the first surface of the prismatic part and the first surface of the second part.

3. The computer-implemented method of claim 2, wherein the first simulated force is applied at a first location upon the first surface of the prismatic part and the second simulated force is applied at a second location upon the first surface of the prismatic part, the first location separated from the second location by a separation distance.

4. The computer-implemented method of claim 1, wherein the first part is one of a first prismatic part, a first sheet, or includes at least a first non-planar surface and the second part is one of a second prismatic part, a second sheet, or includes at least a second non-planar surface.

5. The computer-implemented method of claim 4, wherein the first simulated force is applied at a first location upon the first non-planar surface and the second simulated force is applied at a second location upon the second non-planar surface, the first location separated from the second location by a separation distance.

6. The computer-implemented method of claim 1, wherein the first simulated force is applied at a first location upon the first surface of the first part and the second simulated force is applied at a second location upon the first surface of the first part, the first location separated from the second location by a separation distance.

7. The computer-implemented method of claim 1, wherein the first simulated force and the second simulated force is applied at a first location upon the first surface of the first part for effecting a mating between the first surface of the first part and the first surface of the second part.

8. The computer-implemented method of claim 1, wherein the one or more assembly loads are one or more selected assembly loads.

9. A computer-implemented method for tolerance analysis, the method comprising:
    executing a variation analysis procedure to determine a first set of deformation parameters when a first part is mated with a second part, the variation analysis procedure comprising:
        determining a first simulated force for effecting a mating between an obverse surface of the first part and an obverse surface of the second part, based at least in part on a magnitude of a gap between the obverse surface of the first part and the obverse surface of the second part;
        applying the first simulated force upon the obverse surface of the first part for effecting the mating between the obverse surface of the first part and the obverse surface of the second part;
        determining the first set of deformation parameters based on applying the first simulated force upon the obverse surface of the first part; and
        storing the first set of deformation parameters in a database;
    executing a finite element analysis procedure to determine a second set of deformation parameters when the obverse surface of the first part is mated with the obverse surface of the second part, the finite element analysis procedure comprising:
   determining a second simulated force for effecting the mating between the obverse surface of the first part and the obverse surface of the second part based on one or more assembly loads;
   applying the second simulated force upon the obverse surface of the first part for effecting the mating between the obverse surface of the first part and the obverse surface of the second part;
   determining the second set of deformation parameters based on applying the second simulated force upon the obverse surface of the first part; and
   storing the second set of deformation parameters in the database;
retrieving from the database, the first set of deformation parameters and the second set of deformation parameters; and
obtaining one or more of geometric tolerances, dimensional tolerances, and a deformation of the first part when mated with the second part, by processing at least one of the first set of deformation parameters or the second set of deformation parameters.

10. The computer-implemented method of claim 9, wherein the first part is one of a first prismatic part, a first sheet, or includes at least a first non-planar surface and wherein determining the second simulated force for effecting the mating between the obverse surface of the first prismatic part and the obverse surface of the second part comprises selecting a nominal simulated force.

11. The computer-implemented method of claim 10, wherein the second part is one of a second prismatic part, a second sheet, or includes at least a second non-planar surface.

12. The computer-implemented method of claim 9, wherein the first simulated force is applied at a first location upon the obverse surface of the first part and the second simulated force is applied at a second location upon the obverse surface of the first part, the first location separated from the second location by a separation distance.

13. The computer-implemented method of claim 12, wherein determining the second set of deformation parameters based on applying the second simulated force to the obverse surface of the first part comprises determining an amount of deformation in at least one of a reverse surface of the first part or an internal portion of the first part.

14. The computer-implemented method of claim 9, wherein the first simulated force is applied at a first location upon the obverse surface of the first part for effecting the mating between the obverse surface of the first part and the obverse surface of the second part.

15. The computer-implemented method of claim 14, wherein the first part is one of a first prismatic part, a first sheet, or includes at least a first non-planar surface and the second part is one of a second prismatic part, a second sheet, or includes at least a second non-planar surface.

16. A computer-implemented method for tolerance analysis, the method comprising:
   rendering a finite element analysis (FEA) mesh of one or more parts of an assembly on a display screen of a computer;
   generating a nominal deformed mesh by applying a nominal simulated force upon a first surface of a first part for placing the first surface of the first part in contact with at least a first surface of a second part;
   generating a graphical rendering of at least the first part and the second part for executing a variation analysis procedure;
   generating a set of deformed meshes by executing a set of statistically-varied part dimensions upon one or both of the graphical rendering and the FEA mesh;
   combining the set of deformed meshes with the nominal deformed mesh to generate a combined deformed mesh; and
   determining one or more of geometric tolerances and dimensional tolerances of the assembly by evaluating the combined deformed mesh.

17. The computer-implemented method of claim 16, wherein the first part is a prismatic part and the nominal simulated force is applied to the first surface of the prismatic part for effecting a mating between the first surface of the prismatic part and the first surface of the second part.

18. The computer-implemented method of claim 16, wherein a magnitude of the nominal simulated force is selected for effecting a mating between the first surface of the first part and the first surface of the second part.

19. The computer-implemented method of claim 16, wherein the first part is one of a first prismatic part, a first sheet, or includes at least a first non-planar surface and the second part is one of a second prismatic part, a second sheet, or includes at least a second non-planar surface.

20. The computer-implemented method of claim 16, wherein executing the set of statistically-varied part dimensions upon one or both of the graphical rendering and the FEA mesh is a part of the variation analysis procedure.

* * * * *